(12) United States Patent
UmiKer

(10) Patent No.: US 6,483,434 B1
(45) Date of Patent: Nov. 19, 2002

(54) CONTAINER TRACKING SYSTEM

(75) Inventor: Hans UmiKer, Egg (CH)

(73) Assignee: IFCO System Europe GmbH (DE)

( * ) Notice: Subject to any disclaimer, the term of this patent is extended or adjusted under 35 U.S.C. 154(b) by 0 days.

(21) Appl. No.: 09/670,815

(22) Filed: Sep. 28, 2000

(30) Foreign Application Priority Data

Oct. 20, 1999 (DE) ......................................... 199 50 532

(51) Int. Cl.[7] ............................................. G08B 13/14
(52) U.S. Cl. ................................. 340/572.1; 340/572.4; 340/825.06; 340/825.36; 340/5.92
(58) Field of Search ........................... 340/572.1, 572.4, 340/572.8, 568.1, 825.06, 10.1, 10.3, 10.32, 10.4, 10.51, 825.36, 5.92, 5.63

(56) References Cited

U.S. PATENT DOCUMENTS

| | | | | |
|---|---|---|---|---|
| 5,055,659 A | * | 10/1991 | Hendrick et al. | ............ 235/439 |
| 5,565,858 A | * | 10/1996 | Guthrie | .................. 340/10.33 |
| 5,627,517 A | * | 5/1997 | Theimer et al. | .......... 340/572.1 |
| 5,780,826 A | * | 7/1998 | Hareyama et al. | ........... 235/385 |
| 5,804,810 A | * | 9/1998 | Woodley et al. | ............. 235/492 |
| 5,887,178 A | * | 3/1999 | Griffith et al. | ............... 395/750 |
| 5,942,987 A | * | 8/1999 | Heinrich et al. | ........... 340/10.1 |
| 5,969,595 A | * | 10/1999 | Schipper et al. | ............. 340/426 |
| 6,046,678 A | * | 4/2000 | Wilk | ......................... 340/686.1 |
| 6,130,623 A | * | 10/2000 | MacLellan et al. | ..... 340/825.54 |
| 6,249,227 B1 | * | 6/2001 | Brady et al. | .............. 340/572.1 |
| 6,281,797 B1 | * | 8/2001 | Forster et al. | ............ 340/572.3 |
| 6,341,271 B1 | * | 1/2002 | Salvo et al. | .................... 705/28 |

* cited by examiner

*Primary Examiner*—Daniel J. Wu
*Assistant Examiner*—Toan Pham
(74) *Attorney, Agent, or Firm*—Sam Silverberg

(57) ABSTRACT

The container tracking system comprises a computer system for tracking a plurality of container or carriers. For the purpose of easily tracking any individual container or carrier, a transponder is disposed on the body of the container or carrier. The transponder can be inserted into the body of the carrier in a protected and safe manner. The transponder has a memory configured for transmitting and receiving electronic data, like identification codes, location codes etc. The memory of the transponder (first electronic level) exchanges data with read/write units (second electronic level). A plurality of such read/write units is located on a track or a trajectory of the containers, i.e. is disposed relatively close to a track of the transponder. The computer system of the container tracking system is completed by a processing unit disposed remote from the containers (third electronic level). The distant processing unit receives data from the read/write units thereby permitting a monitoring of all data memorized in the transponders.

8 Claims, 3 Drawing Sheets

CONTAINER TRACKING SYSTEM

BACKGROUND OF THE INVENTION

The invention relates to a container tracking system as disclosed in the German patent application DE 199 50 532.2 filed on Oct. 20, 1999. This disclosure is fully incorporated by reference.

The prior patent application is inter alia directed to an information system comprising at least one information center and a plurality of reusable transportation means, wherein a computer is included in said information center which interrogates at least the locations and some mechanical parameters of said transportation means and which stores that information.

Tracking systems of different kinds based on transponders or electronic tags or radio tags or RFID (radio frequency identification) mounted on containers or carriers of some kind are known, e.g. from the documents DE 43 13 049, EP 412 020, WO96/13015, EP 905 057, EP 507 773, EP 292 236, DE-GM 92 12 243, EP 025 510, WO97/38661, EP 458 722, EP 443 897, EP 411 012, DE 43 34 668 and DE 196 19 851.

The reusable transportation means is for instance a container or a palette. The container or palette comprises a transponder which receives and stores information on a location of said transportation means and in addition information on a mechanical state of readiness of the transportation means and on the condition of a transported merchandise and on a profile of usability of the transportation means.

BRIEF SUMMARY OF THE INVENTION

The object of the instant invention is to further extend the trackability of such reusable containers having transponders.

The solution to this object is given in the patent claims 1 to 9. Claim 1 calls for a container tracking system comprising a trackable container or carrier and a computer tracking system. The trackable container or carrier includes a housing body and a transponder disposed in the housing body, the transponder having a memory and being configured for transmitting and receiving data to and from the memory. The computer tracking system which supplements the container tracking system comprises a plurality of read write units, each unit being configured for transmitting and receiving data to and from the memory of the transponder. The data which are exchanged between the computer tracking system and the memory of the transponder concern at least a location of the container corresponding to a location of each read write unit, and a processing unit disposed at a distance remote from the container and being configured for receiving the data from at least one of said read write units and the transponder, the processing unit thereby permitting a monitoring of the data. The container tracking system comprises three electronic levels:

a transponder having a memory disposed in the housing body of the trackable container, a plurality of read/write units disposed relatively close to the track of the container transponder, and a central processing unit disposed remote from the track of the container transponder.

DETAILED DESCRIPTION OF THE INVENTION

The central processing unit may be configured for interrogating the container transponders, when they are located in the trajectory between two read/write units.

This remote processing unit may be coupled to the Internet and/or to a GPS link so that the data of the container transponder may be online accessible.

The transponder may include a sensors, which is coupled to the memory therein. Thus, the container tracking system is apted for sensing a variable which is pertinent to a container and/or a contents of the container. The sensor is adapted to generate a sensed value for the variable and to transmit the sensed value to the memory of the transponder, the memorized data thereby including the sensed value. The container tracking system is thereby permitted to monitor the data of the sensed variable, for instance a temperature, a humidity level, a luminosity or a radiation variable within the container.

The transponder on the lowest level of the container tracking system may further include a timer coupled to the memory. The timer may record the time between two events to generate a value corresponding to the time elapsed and to transmit the sensed value to the memory. The data may thereby include a time value corresponding to the time elapsed between two events. The start time may be induced by the passing a read write unit and the stop time may be induced by the passing of another read write unit. The two events may also correspond to an indirect starting and/or stopping of the timer when a respective read write unit obtains a command from the central processing unit.

Tracking data like origin, destination, departure from the origin and arrival time at the destination may be memorized in the transponder. It is possible to store a use profile over the life time of a container within the memory of the respective built-in transponder.

The invention is explained in more detail by referring to the incorporated application DE 199 50 532.2 and to some prior art and to the FIGS. 1 to 10.

The invention applies to a reusable transportation means, as for instance a receptacle or a container or a packing or a pallet or a trolley car. Such a kind of transportation means may comprise a transponder (also called: electronic tag), which can receive, store and provide for inquiry information about the location of the transportation means.

A method and a device for commissioning semi-automatically different commodities is known from the German patent specification DE 19526131; it is this kind of a device from which the invention starts. According to DE 19526131, commodities provided for in shelves, are transported by a cargo carrier on a conveyer belt. In the beginning, a commissioning order is edited by the customer computer; this order is transmitted via a transponder teletype writer onto an encodable transponder which is provided on the cargo carrier; thereby, control operations acting upon the conveyer belt are triggered. At a given control station, a movable computer for handling commissions and run by staff members exchanges information with said transponder.

The invention is confronted with the problem of designing the known, reusable transportation means including the transponder in such a manner that it becomes fit for considerably longer routes of transportation and for considerably varying profiles of exploitation. In this context, the trackability must be extended.

The problem is solved by a reusable transportation means in which the transponder is arranged in accordance with an information system, wherein a plurality of such transponders installed in transportation means are inquired by a computer located in an information center.

The reusable transportation means may be configured in the form of a folding chest, in which the transponder may be installed in an invisible and hidden manner.

The invention is explained in more detail on the basis of a preferred of embodiment of a folding chest fitted with a transponder.

Fresh products play an outstanding role in the commerce of foodstuffs. Freshness and quality are the most important shopping criteria for the consumer.

An altered environmental consciousness, which finds expression not only in the products themselves but also in the packaging systems, adds to this criterion. Official regulations regarding the disposal of packaging materials have to be respected, too.

The totality of these requirements is turned into a multiway-packing system which is eco-friendly and economical. The quality of merchandise is ensured during transport, for example in the case of fruit, vegetables, eggs, meat products, sausages, poultry, cheese or fish. Damage in transit is minimized; the cost in logistics is decreased; one-way packages involving respective costs and risks in terms of disposal are avoided.

A "green" chest for fruit and vegetables has, for instance, the basic dimensions of 60 cm×40 cm. Yet, the basic format may also have 40 cm×30 cm. In using a crate unfolder, 850 folding chests can be put open per hour, so that they can accommodate fruit, vegetables, etc. At the end of the transport route and after emptying, the folding chests can be fold up again by means of a collapsing machine.

The cycle of the multiway-transportation packings operates as follows:

A manager of the reusable transportation means including a transponder delivers the chests, containers and boxes, transformed into a volume-saving configuration to producers, wrappers and industries. There, the receptacles are unfolded and pass, when being filled, to the traders respectively the distributors. Thereafter, the empty folding chests return to the store houses and are fetched by the manager of the traders. Finally, they are cleaned, inspected and sorted by types. Thereafter they are ready for re-entering the cycle.

The information system in accordance with the invention can be used in passing beyond borders and countries. For example, a folding chest designed specifically for the distribution of bananas has exploitable inside dimensions of 570 mm in length, 370 mm in width and 199 mm in height; the outside dimensions, when stacked, are respectively 600 mm in length, 400 mm in width and 211 mm in height; the outside dimensions, when folded, are respectively 600 mm in length, 400 mm in width and only 45 mm in height.

Another example of embodiment is given by folding chests for heavy charges. The chests having 301 mm or 352 mm of height are suited for receiving a charge of up to 25 kg of fruit. In the empty state the reduction in volume amounts to about 80%. The closure mechanism of the folding chests is easy to be handled.

Arranged on the chests, or also pallets, in accordance with the invention there are transponders which communicate, for example, with portable data terminals which form read/write units. By the intermediary of such portable data terminals, each moving of the chests and/or pallets can be tracked and, for instance, fed into the Internet system, wherefrom the information can be fetched.

The transponders are installed in the chest or pallet in such a manner that they are not visible from the outside. In this way the danger of fraudulent data manipulation is reduced. The transponders may be incorporated by moulding or fitting. They are insensible to environmental atmospherical influences as for instance air moisture or temperature.

When a packing operation has come to an end, the mobile data terminal inputs the data, arriving from a packing hall of a producer, either into the Internet, or it transmits them to the computer of an information center or directly to the customer by GPS.

The transponder is connected to a sensor which may determine by means of optical, electrical or magnetic scanning whether or not the folding chest is locked in the transport state or is folded into the return transport state. This information about the mechanical state of readiness of the folding chest may be stored in the transponder and is available for being fetched. The folding chest or, more generally speaking, the transporting means may also allow for being mechanically locked into more than two of such states.

In order to monitor the quality of the transported merchandise, a temperature profile or a temperature limit may be stored in the transponder. A temperature sensor, which may also be installed in the folding chest and connected to the transponder sensor, measures the march of temperature to which a piece of perishable food is subjected. The time of filling or the expiry date of the merchandise is information which may be stored in the folding chest without using a special sensor. Said information can be retrieved centrally in order to update the logistical requirements, for example in order to accelerate transportation. It is, however, likewise possible that the transponder transmits by itself an alarm signal on the basis of the stored data and criteria, if the merchandise risks perishing.

In terms of additional information about the folding chest itself, the memory of the transponder may contain: the registration number and/or the owner of the folding chest; the state of load or filling if the folding chest is open; tara, age of date of manufacture of the folding chest; data about the state of cleanliness, humidity or maintenance of the folding chest. Valuable conclusions about the condition of the folding chest can be drawn when several data of this kind would be combined to yield a usability profile which provides information about the use of the chest in the interval between the date of its manufacture and the acute date.

Depending upon the individuality of the merchandise, the following data of information may be additionally contained in the memory of the transponder: type of the charge, length or weight charge, owner of the charges, place of origin and/or place of destination of the merchandise, type of packaging, delivery period, receiver of the merchandise, price of the merchandise, color of the merchandise, consistency of the merchandise, number of items or of bunches, commission number of the merchandise, acoustic emissions or noises of the merchandise.

Apart from the temperature sensor already mentioned, the transponder may be connected also to other sensors, which measure for instance the humidity of air, the air pressure respectively the altitude, the exposition of radiation, the dust, the noise, the luminisity or the vibration of the surroundings.

The present invention relates to a casing preferably made of plastic material and capable of being processed by molding, and used for protectively housing a transponder, which comprises a plane carrier fitted with an enclosed chip and a frame antenna extending along said carrier. It also relates to a container equipped with such a type of casing.

A transponder in this sense is a transmission- reception device operating in accordance with a request-and-answer system. A coded request signal received by the transponder is decoded and evaluated according to the identification and other information of the enquirer. Thereafter, a coded response signal, selectively destined to the enquirer, is transmitted, which contains the desired information, which signal is decoded automatically and evaluated by the enquirer likewise.

Thus, these transponders consist of a chip, which is disposed on a plane carrier, having the shape of a fine-meshed sieve, which carrier supports also the transmit-and-receive antenna. A transponder of this kind is also referred to as "tag" by experts in the field. Conventionally, the tag is stuck on the object to be equipped with it, or else, if the object is made of plastic material, the tag is laid, for example, in an injection mold and then embedded by injection molding. Examples of said objects are, e.g. containers or baskets wherein products, for example, provisions, are transported from a whole sale distributor to a chain sales store.

Stuck transponders manufactured in the form of tags may incur damage. In the case of plastic containers which are manufactured in a mold by injection, the transponders may be damaged by the injection itself, and they can also be shifted, so that they are ineffective in use.

This problem is solved in a way is disclosed in EP 996 085.

The advantages obtained consist essentially in the fact that the transponder is entirely enclosed and protected right on from the beginning and that it cannot be displaced during the injection molding procedure.

The transponder is incorporated safely in the container by way of molding.

This part of the invention is explained hereafter in more detail on the basis of drawings which illustrate only one way of implementation.

The casing consists of a first casing part 1 made of plastic material and of a second casing part 2 made of plastic material.

Figure 1:
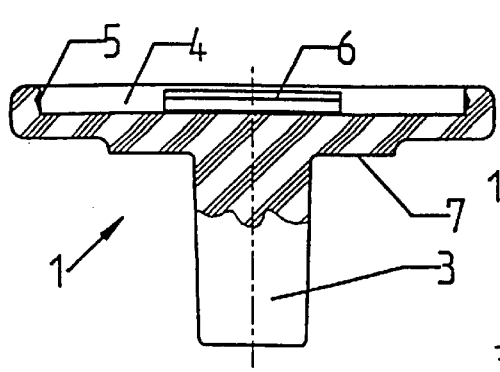
FIG. 1 shows a vertical cross-section of a first casing part and of a second casing part, with the first part having a protruding nose for positioning the part and being adapted to receive a transponder.

The first casing part 1 shown in vertical section in FIG. 1 comprises a protruding nose for positioning the nose. This first casing part is formed with a deepening 4, surrounded by side walls 5. The body of the first casing part 1 has a square ground plot so that the side walls run in a straight line.

In each of the side walls 5 of the first casing part 1, there is formed a snap lock portion with the side wall 5 having the shape of an inner groove 6. Moreover, the first casing part 1 is stepped up by an elevation 7 on the side which comprises the protruding nose 3.

The second platelike casing part 2 is provided along its four edges with snap lock sections having the shape of beads 8. Moreover, the second casing portion 2 is provided with a bead 9 too.

In the second casing portion 2 having the shape of a square ground plate, four longitudinally extended guiding indentation 10 are formed, which are angularly spaced apart from one another by 90°.

Figure 6:
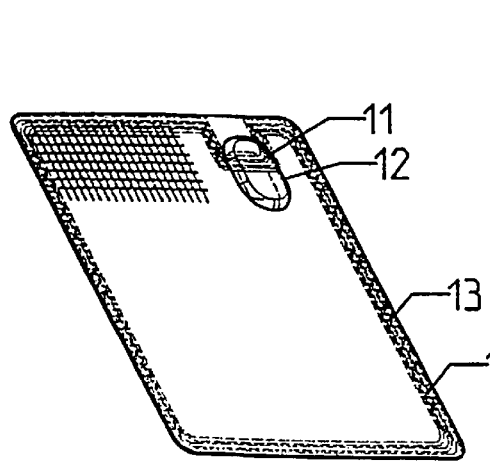
FIG. 6 shows a top view of a transponder.

FIG. 6 shows a top view of a transponder to be laid into the casing consisting of the parts 1 and 2. The transponder comprises a carrier 13 which has the form of a fine-meshed sieve. The chip 11 of the transponder is arranged on the carrier 13, which chip 11 is completely enclosed by a sheathing 12 made of plastic material. The chip 11 is connected to the frame antenna 14 of the transponder.

Figure 3:
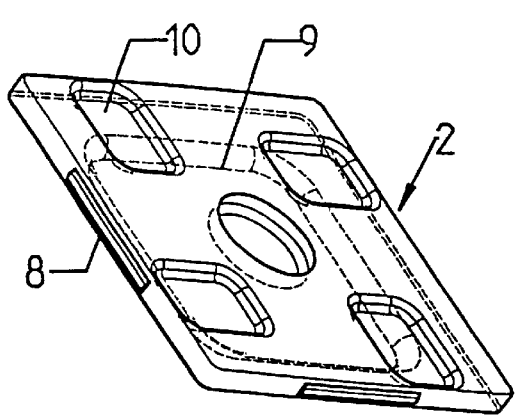
FIG. 3 shows a view of the interior.

It is clear that, when the tranpsonder is going to be deposited on the second part 2 shown in FIG. 3 to which purpose its position shown in FIG. 6, has been inverted spatially by 180°, the bead-shaped sheath 12 ends up in lying in one of the guiding indentations 10. As can be seen in FIG. 3, there are four possible positions prepared for the transponder on the second casing part 2. In each one of these positions the transponder is guided by the enclosure projecting into a respective guiding indentation 10, i.e., the transponder is unable "either to shift" or to rotate (because of the elongated shape of the enclosure 12 and the respective guiding indentation).

Figure 4:
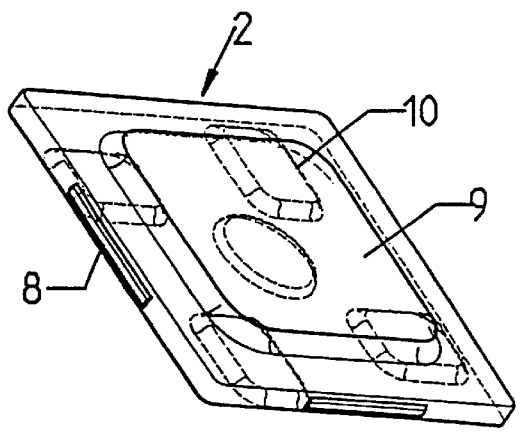
FIG. 4 is an illustrative representation of a second casing part.
Figure 5:
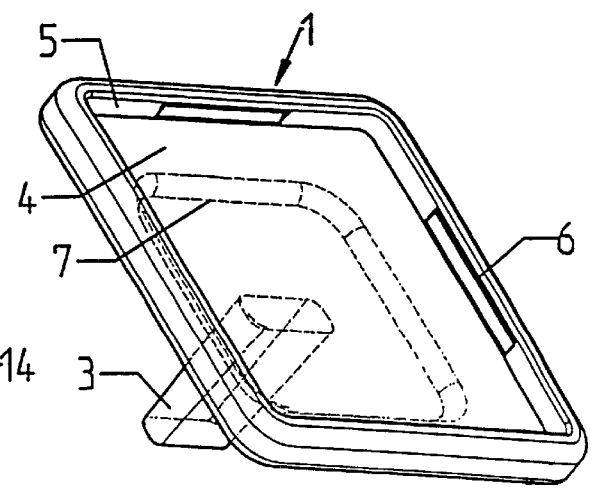
FIG. 5 is an illustrative representation of a first casing part, which is shown as being disposed in alignment with the second casing part.

For the purpose of mounting the transponder is laid in the position taken in FIG. 6 for example, into the deepening 4 provided in the first casing part 1, viz. in particular FIG. 5. Thereafter, the second casing portion 2 is inserted with keeping the position taken in FIG. 4, with the external beads 8 of the second casing portion 2 snapping into the inner grooves 6 of the casing part 1, so that these two parts are held to oneanother by a snap connection.

Figure 2:
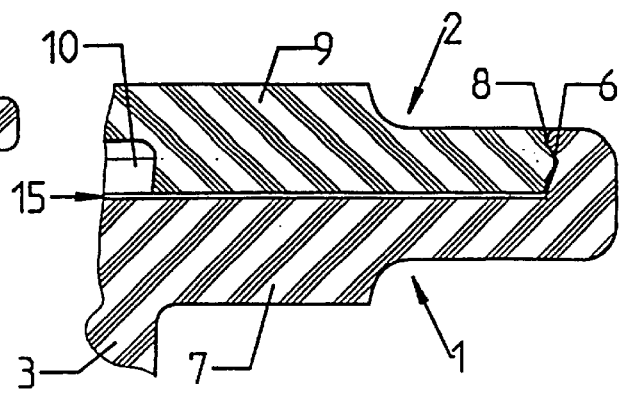
FIG. 2 shows a cross-section of an edge portion of a casing consisting of two casing parts which are connected to one another by means of a snap-lock.

In this position, the external beads 8 and the inner grooves 6 are disposed such—viz. FIG. 2—that in between the main surfaces opposing one another of the two casing parts 1, 2 there exists a space for housing the transponder, which space is indicated in FIG. 2 by the arrow 15.

Figures 7, 8:
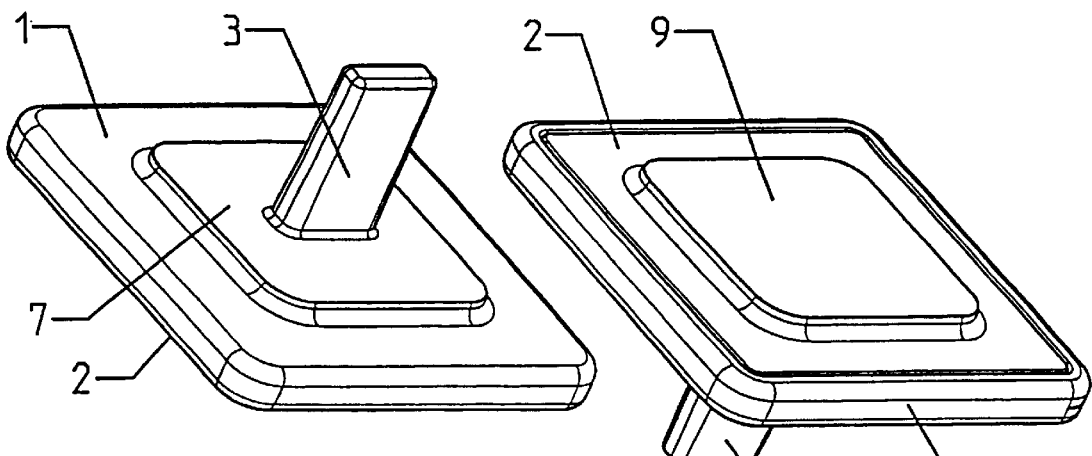
FIG. 7 is an illustrative representation of the casing formed in accordance with the invention and viewed from the side, with the positioning projection thereon.
FIG. 8 is an illustrative representation corresponding to the one shown in FIG. 7 but exposing the opposite side of the casing.

As a result, a casing is obtained with a transponder being enclosed, as shown in the FIGS. 7 and 8.

Figure 9:
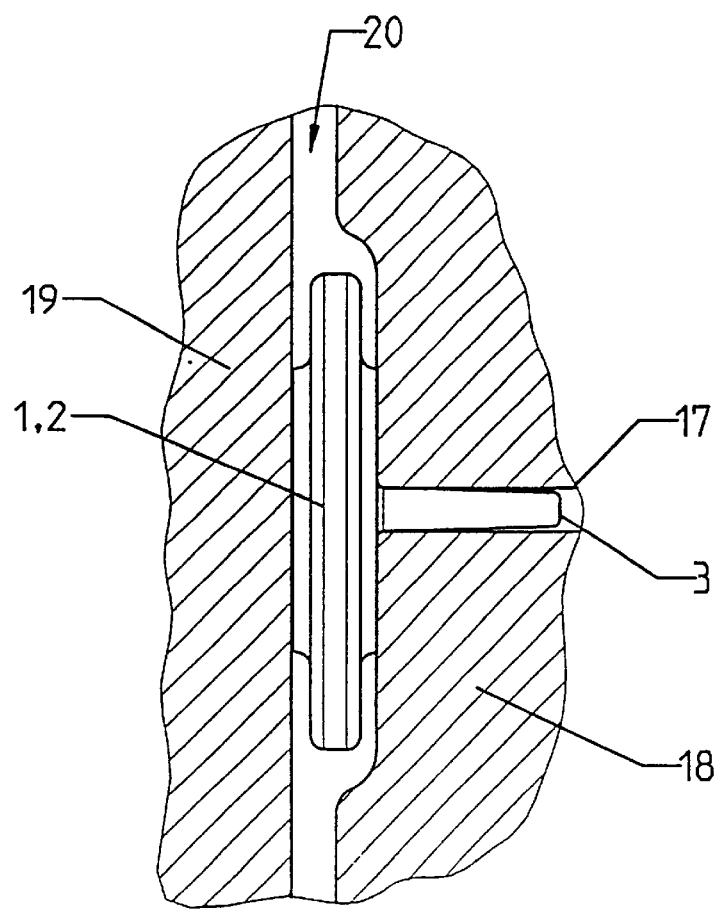
FIG. 9 shows schematically the mode of insertion of the casing into an injection mold.

In order to manufacture a container by way of injection molding, which comprises the casing 16 used for storing any kind of merchandize, the positioning nose 3 of the casing—viz. FIG. 9—is passed through a window 17 in a wall 18 of an injection mold element. Thereafter, a further injection mold element 19 is disposed in a known manner at a certain distance from the wall 18, i.e. of the entire part to be obtained by injection molding, so that the container 16 can be formed by injection molding. By virtue of the positioning nose 3, the casing 1, 2 installed in the injection molding tool (1, 23) is not only positioned exactly, but also, it cannot be shifted or twisted by the entering fused plastic material. The fused plastic material, which is introduced into the injection mold for the manufacture of a whole casing 1, 2, flows also into the gap 20, where it merges with the casing 1, 2 placed therein, in order to produce an materially intimate connection between the container 16, e.g. a wall portion of it, and the casing 1, 2 which includes the transponder safely disposed therein.

Figure 10:
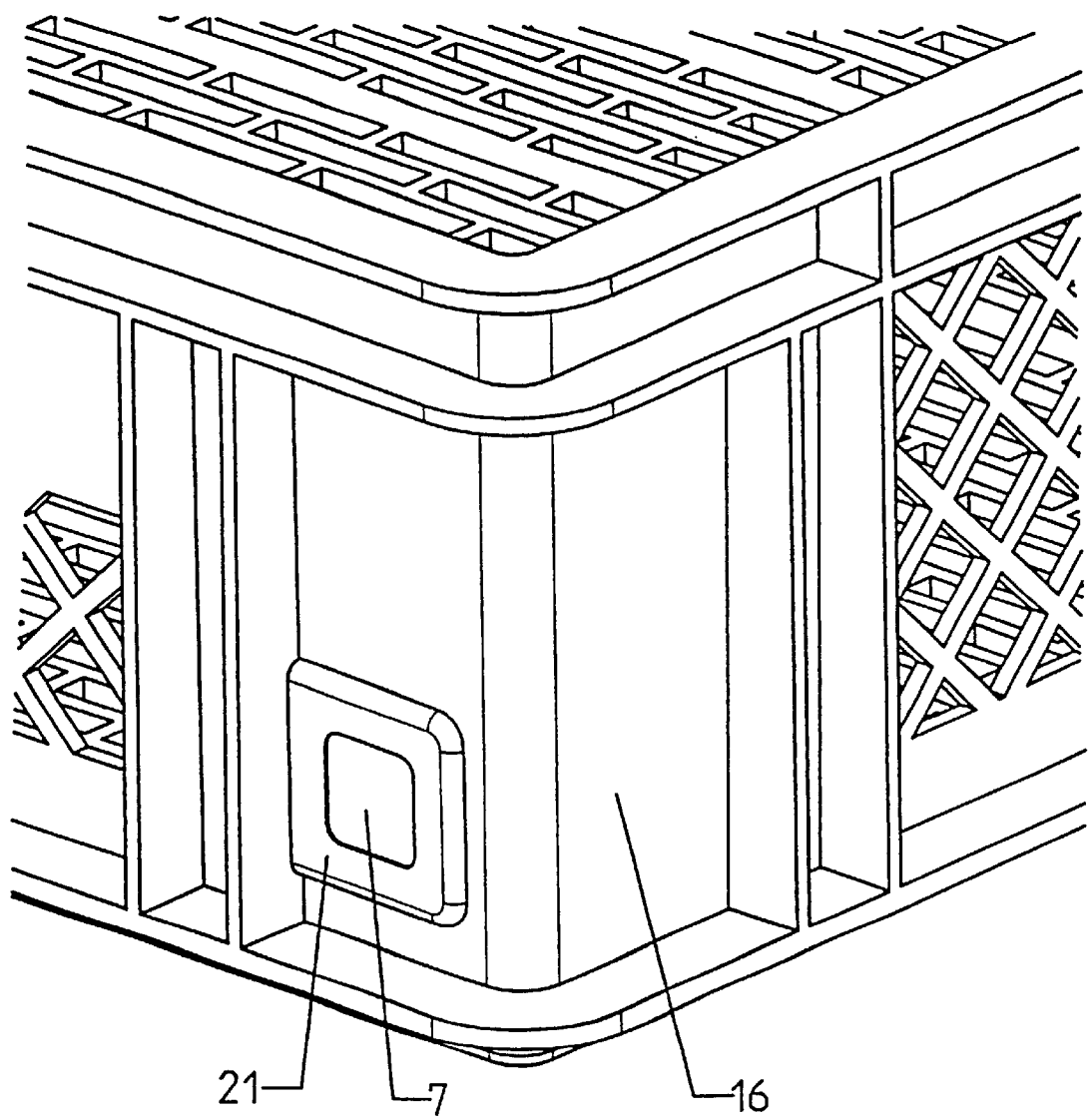
FIG. 10 is an illustrative representation of an edge portion of a container, with a casing being inserted therein.

In the course of removing the container 16 obtained by injection molding from the mould, the positioning nose 3 is detached therefrom. Since the overall thickness of the casing 1, 2 is equal to the thickness of the wall of the container in the respective region concerned, to which said region is in alignment with the elevations 7, 9. For the reason of strength, the wall of the container 16 comprises a thickening 21 as shown in FIG. 10, in the area where the casing 1, 2 is integrated by way of casting, with FIG. 10 showing a corner region of the container 16 where the transponder is embedded. It should be noted that for the sake of improving the detection of the locus of the transponder in the container 16, the casing parts 1, 2 may be tinted with different colors. As an example of a container tracking system based on container-mounted electronic components or carrier transponders, respectively, the container tracking system of the applicant covers 23 countries and has 6.000.000 on cycle. 11 different kinds of containers are handled by this container tracking system. The receiving and emitting means of the transponder do not need a battery, as is known in the art.

What is claimed is:

1. A container tracking system comprising:
   a trackable container or carrier including: a housing body; and
   a transponder disposed on the housing body, the transponder having a memory and being configured for transmitting and receiving data to and from the memory; and
   a computer tracking system comprising:
      a plurality of read/write units, each unit being configured for transmitting and receiving data to and from the memory of the transponder, the data concerning at least a location of the container corresponding to a location of said each read/write unit, and a processing unit disposed at a distance remote from the container and being configured for receiving the data from at least one of said read/write units and the transponder, the processing unit thereby permitting a monitoring of the data;
      wherein the transponder includes a timer coupled to the memory therein for recording a time between two events, the timer being adapted to generate a value corresponding to the time elapsed and to transmit the sensed value to the memory, the data thereby including the value corresponding to the time elapsed, wherein the two events correspond to a starting and a stopping of the timer by two of the read/write units.

2. The container tracking system according to claim 1, wherein the processing unit is further configured for interrogating the transponder in a trajectory thereof between two read/write units.

3. The container tracking system according to claim 1, wherein the transponder includes a sensor coupled to the memory therein for sensing a variable pertinent to at least one of the containers or contents thereof, the sensor being adapted to generate a sensed value for the variable and to transmit the sensed value to the memory, the data thereby including the sensed value.

4. The container tracking system according to claim 3, wherein the variable is at least one of a temperature, a humidity level, a luminosity and a radiation level within the container.

5. The container tracking system according to claim 1 wherein at least one of the two events corresponds to indirect starting and/or an indirect stopping of the timer by said processing unit via a read/write unit.

6. The container tracking system according to claim 1, wherein the memory is further adapted to store data concerning at least one of an origin, destination, and departure time from the origin and arrival time at a destination of the container.

7. The container tracking system according to claim 1, wherein the remote processing unit is coupled to the Internet for transmitting the data thereto, the data thereby being available online.

8. The container tracking system according to claim 1, wherein the remote processing unit is coupled to a global position system (GPS) link.

* * * * *